United States Patent
Yoo et al.

(10) Patent No.: US 11,315,567 B2
(45) Date of Patent: *Apr. 26, 2022

(54) ELECTRONIC DEVICE AND METHOD FOR CONDUCTING DIALOG

(71) Applicant: Samsung Electronics Co., Ltd., Suwon-si (KR)

(72) Inventors: Sang Hyun Yoo, Seoul (KR); Young-Seok Kim, Suwon-si (KR); Jeong-Hoon Park, Seoul (KR); Jehun Jeon, Suwon-si (KR); Junhwi Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

This patent is subject to a terminal disclaimer.

(21) Appl. No.: 16/872,664

(22) Filed: May 12, 2020

(65) Prior Publication Data

US 2020/0273460 A1    Aug. 27, 2020

Related U.S. Application Data

(63) Continuation of application No. 15/992,412, filed on May 30, 2018, now Pat. No. 10,685,653.

(30) Foreign Application Priority Data

Nov. 29, 2017  (KR) .................. 10-2017-0161701

(51) Int. Cl.
*G10L 15/22* (2006.01)
*G10L 15/18* (2013.01)
*G06F 3/16* (2006.01)
*G10L 15/08* (2006.01)
*G06F 3/0484* (2022.01)

(52) U.S. Cl.
CPC .............. *G10L 15/22* (2013.01); *G06F 3/167* (2013.01); *G10L 15/1815* (2013.01); *G06F 3/0484* (2013.01); *G10L 2015/088* (2013.01); *G10L 2015/223* (2013.01); *G10L 2015/228* (2013.01)

(58) Field of Classification Search
CPC .......... G06F 3/167; G06F 3/16; G06F 3/0484; G10L 15/1815; G10L 15/18; G10L 2015/228; G10L 2015/088; G10L 15/08; G10L 2015/223; G10L 15/22; G10L 2015/225

See application file for complete search history.

(56) References Cited

U.S. PATENT DOCUMENTS

| 9,203,791 | B1 | 12/2015 | Olomskiy |
| 10,891,947 | B1* | 1/2021 | Le Chevalier ...... G10L 15/1815 |
| 2006/0248584 | A1 | 11/2006 | Kelly et al. |

(Continued)

FOREIGN PATENT DOCUMENTS

KR    10-1162974 B1    7/2012

*Primary Examiner* — Huyen X Vo
(74) *Attorney, Agent, or Firm* — NSIP Law

(57) ABSTRACT

An electronic device and an method of the electronic device are provided, where the electronic device maintains a context that does not reflect a request for a secret conversation, in response to the request for the secret conversation being received from a first user, and generates a response signal to a voice signal of a second user based on the maintained context, in response to an end of the secret conversation with the first user.

20 Claims, 7 Drawing Sheets

(56) References Cited

U.S. PATENT DOCUMENTS

| | | |
|---|---|---|
| 2009/0265544 A1 | 10/2009 | Moona et al. |
| 2010/0082753 A1 | 4/2010 | Allen et al. |
| 2013/0086191 A1 | 4/2013 | Slotznick |
| 2013/0191762 A1 | 7/2013 | Rajagopalan et al. |
| 2014/0309999 A1* | 10/2014 | Basson .................. G10L 25/00 704/270 |
| 2015/0156171 A1* | 6/2015 | Biswas ................ G06F 21/606 726/26 |
| 2015/0350261 A1 | 12/2015 | Foote et al. |
| 2018/0367484 A1* | 12/2018 | Rodriguez ........... G06Q 10/101 |
| 2019/0138267 A1* | 5/2019 | Mailey ............... G06F 3/04817 |

* cited by examiner

800

| Item | Content |
|---|---|
| Subject | Sports |
| Mood | Good |
| Sentence type | Question |
| Keyword | Baseball |
| ⋮ | ⋮ |

ELECTRONIC DEVICE AND METHOD FOR CONDUCTING DIALOG

CROSS-REFERENCE TO RELATED APPLICATIONS

This application is a continuation of U.S. patent application Ser. No. 15/992,412 filed on May 30, 2018 which claims the benefit under 35 USC § 119(a) of Korean Patent Application No. 10-2017-0161701, filed on Nov. 29, 2017, in the Korean Intellectual Property Office, the entire disclosure of which is incorporated herein by reference for all purposes.

BACKGROUND

1. Field

The following description relates to an electronic device and an operating method of the electronic device.

2. Description of Related Art

A dialog system or a conversational agent receives, as an input, an utterance of a user and automatically generate a response to the utterance. The utterance of the user may include, for example, a question asking for information or a command requiring an operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In another general aspect, there is provided a method of operating an electronic device, the method including maintaining a context that does not reflect a request for a secret conversation, in response to the request for the secret conversation being received from a first user, and generating a response signal to a voice signal of a second user based on the maintained context, in response to an end of the secret conversation with the first user.

The maintaining of the context may not reflect a voice signal received from the first user during the secret conversation and a response signal generated during the secret conversation.

The maintaining of the context may include maintaining a context that reflects conversation information acquired before the request for the secret conversation is received and that may not reflect the request for the secret conversation.

The conversation information may include a voice signal that is received from the first user or the second user before the request for the secret conversation is received, and a response signal that is generated before the request for the secret conversation is received.

The secret conversation with the first user may include reflecting a voice signal received from the first user during the secret conversation in the maintained context, and generating a response signal corresponding to the voice signal based on the maintained context reflecting the voice signal.

The method may include determining whether the request for the secret conversation is received from the first user.

The determining of whether the request for the secret conversation may be received from the first user may include determining whether the request for the secret conversation may be received from the first user based any one or any combination of whether a voice signal of the first user may include a word corresponding to the secret conversation, and whether a button is activated by the first user to request the secret conversation.

The context may include one of structured text, unstructured text and a vector that indicate a context of a conversation between the electronic device and one of the first user or the second user.

The context may include a first context for the first user and a second context for the second user, the maintaining of the context may include maintaining the second context, and a voice signal received from the first user during the secret conversation with the first user and a response signal generated during the secret conversation may be reflected in the first context.

The generating of the response signal may include generating a response signal corresponding to a voice signal of the second user based on the second context.

The voice signal received from the first user or the second user after the end of the secret conversation and a response signal corresponding to the voice signal may be reflected in the first context and the second context.

The generating of the response signal may include reflecting the voice signal of the second user in the maintained context, and generating the response signal corresponding to the voice signal of the second user based on the context reflecting the voice signal.

In another general aspect, there is provided an electronic device including a processor configured to maintain a context that does not reflect a request for a secret conversation, in response to the request for the secret conversation being received from a first user, and to generate a response signal to a voice signal of a second user based on the maintained context, in response to an end of the secret conversation with the first user.

The processor may be configured to maintain a context that reflects conversation information acquired before the request for the secret conversation is received and that does not reflect the request for the secret conversation.

The secret conversation with the first user may include reflecting a voice signal received from the first user during the secret conversation in the maintained context and generating a response signal corresponding to the voice signal based on the maintained context reflecting the voice signal.

The processor may be configured to determine whether the request for the secret conversation is received from the first user.

The context may include a first context for the first user and a second context for the second user, and the processor may be configured to maintain the second context, and to reflect, in the first context, a voice signal received from the first user during the secret conversation with the first user and a response signal generated during the secret conversation.

In another general aspect, there is provided an electronic device including a touch-sensitive display, a memory configured to store a context, and a processor configured to restrict an update of the context, in response to receiving a request for a secret conversation from a user, indicate, on the touch-sensitive display, that the context is not updated during the secret conversation, generate a first response signal based on the context reflecting a first voice signal of the user, determine whether a request for an end of the secret conversation is received from the user, in response to receiving a second voice signal from the user, generate a second response signal based on the context reflecting the second voice signal of the user, update the context with the second voice signal and the second response signal, in response to the request for the end of the secret conversation being received.

The processor may be configured to change the touch-sensitive display to indicate that the context is being updated, in response to the request for the end of the secret conversation being received.

The context may include a dialog between the electronic device and one or more users.

Other features and aspects will be apparent from the following detailed description, the drawings, and the claims.

Figure 1:
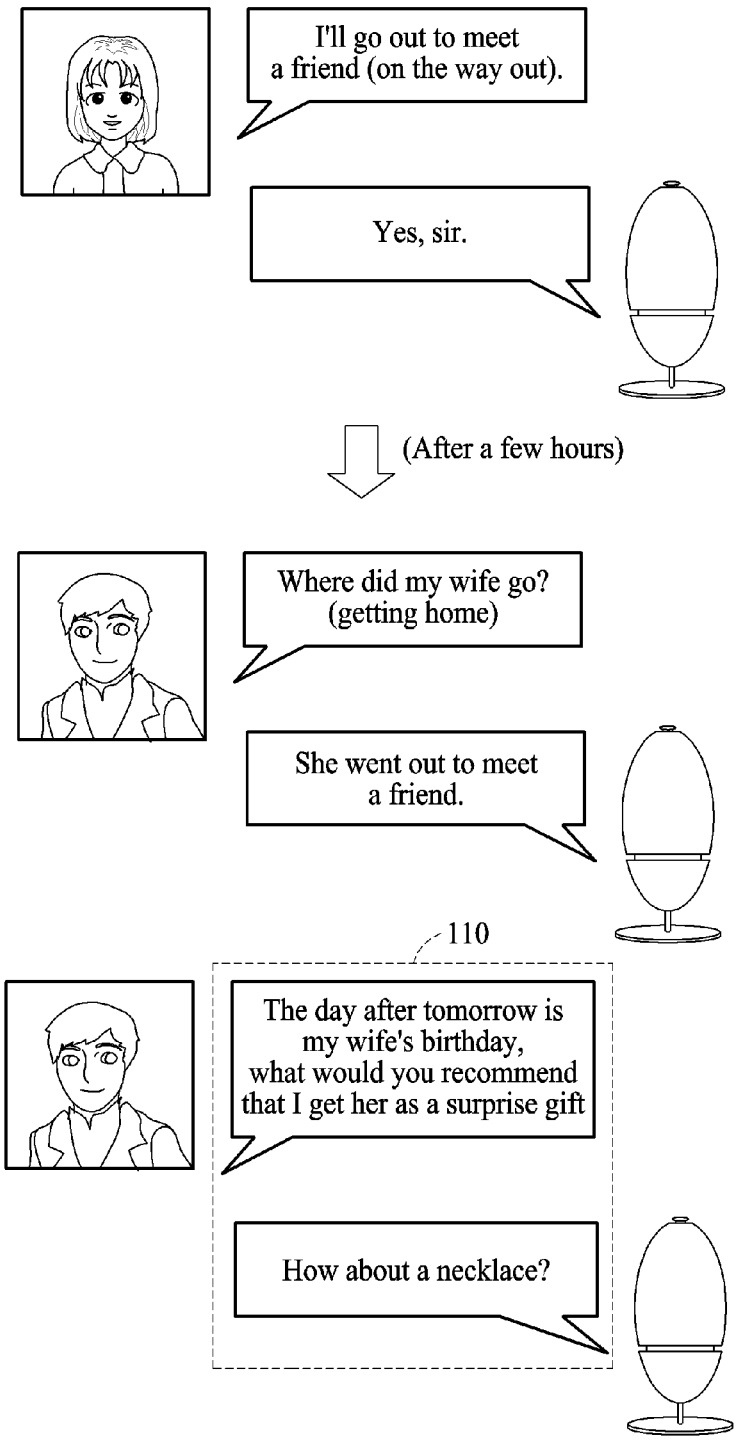
FIG. 1 illustrates an example of a conversation between a user and an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for describing various examples only, and is not to be used to limit the disclosure. The articles "a," "an," and "the" are intended to include the plural forms as well, unless the context clearly indicates otherwise.

Hereinafter, examples will be described in detail below with reference to the accompanying drawings, and like reference numerals refer to the like elements throughout.

In the following description, examples may be used to perform a conversation with a user in an electronic device. For example, performing a conversation may include receiving an input of a voice signal from a user and generating and outputting a response signal to the input of the voice signal. Also, the performing the conversation may include an operation of recognizing a user who utters a voice for the voice signal.

In an example, the method and apparatuses disclosed herein are implemented in various types of electronic devices, such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, personal computers (PC), laptop computers, tablet computers, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, televisions (TVs), a high definition television (HDTV), a smart appliance, a smart home appliance such as a smart speaker, a smart television (TV), a smart refrigerator or a smart lamp, or a smart vehicle, an intelligent vehicle, kiosks, a biometrics-based door lock, a security device, a financial service device, communication systems, image processing systems, graphics processing systems, various Internet of Things (IoT) devices that are controlled through a network, a smart vehicle, other consumer electronics/information technology(CE/IT) device, or any other device capable of wireless communication or network communication consistent with that disclosed herein.

In an example, the method and apparatuses disclosed herein described herein may be incorporated in a vehicle. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an aircraft, an unmanned aerial vehicle, a drone, or a mobile device.

In an example, the method and apparatuses disclosed herein may be employed to perform a conversation with a user and electronic devices, such as, for example, a smartphone, a mobile device, a smart home system, an intelligent vehicle, and an automated teller machine (ATM).

FIG. 1 illustrates an example of a conversation between a user and an electronic device.

In an example, the electronic device is configured to receive a voice signal of a user and to generate a response signal corresponding to the received voice signal. In an example, the electronic device includes a dialog system, which is available to multiple users.

In an example, the electronic device is located in a space, such as, for example, a house that is available to many users, and the electronic device generates and outputs a response signal corresponding to voice signals received from the users in the space. In an example, the electronic device receives a voice signal of a user collected by a remote device located in the space, via a wired or wireless communication, generates a response signal corresponding to the received voice signal, and transmits the response signal to the remote device. In an example, the remote device outputs the response signal.

For convenience of description, an example in which the electronic device located in a space available to many users is described below, however, other configurations may be used may be used without departing from the spirit and scope of the illustrative examples described. In another example, the electronic device receives a voice signal of a user from a remote device located in a space available to users and transmits a response signal to the remote device.

In an example, the dialog system is a conversational agent that receives a voice signal of a user and generates a response signal corresponding to the voice signal. The dialog system performs various types of conversations, for example, a question and answer (for example, "How is the weather today?"), a command execution (for example, "Play back music"), or an everyday conversation (for example, "It was hard today").

For example, the electronic device converses with a current user by using a voice signal of a previous user and a response signal to the voice signal as contexts, even though the current user does not repeat a previous conversation. In an example, some users who do not want their conversation to be reflected in the conversation of another user may request a secret conversation. A voice signal received during the secret conversation or a response signal corresponding to the voice signal is not reflected in a context, and thus a privacy of a corresponding conversation is protected.

Referring to FIG. 1, a first user and a second user converse with the electronic device based on contexts.

The first user utters a voice for a voice signal stating "I'll go out to meet a friend" to the electronic device. The electronic device recognizes that the voice signal received from the first user merely notifies the electronic device of a schedule of the first user, and outputs a response signal "Yes, sir." The second user appears and utters a voice signal stating "Where did my wife go?" to the electronic device. The electronic device recognizes that the voice signal received from the second user corresponds to a question, and outputs a response signal "She went out to meet a friend" based on a context that reflects a previous conversation with the first user.

The second user utters a voice for a voice signal stating "The day after tomorrow is my wife's birthday, what would you recommend that I get her as a surprise gift?" In an example, the electronic device recognizes that the voice signal received from the second user corresponds to a question and that a phrase "surprise gift" is included in the voice signal. The electronic device recognizes that the second user requests a secret conversation based on the phrase "surprise gift" and performs a secret conversation.

The electronic device prevents a secret conversation 110 from being reflected in a context for other conversations. For example, the secret conversation 110 includes the voice signal "The day after tomorrow is my wife's birthday, what would you recommend that I get her as a surprise gift?", and a response signal "How about a necklace?" corresponding to the voice signal. Thus, the electronic device prevents the secret conversation 110 from having an influence on a response signal generated for a voice signal of the first user. The electronic device does not reflect, in a context, a voice signal received during a secret conversation with a user and a response signal corresponding to the voice signal, to protect a privacy of the secret conversation from other users.

Figure 2:
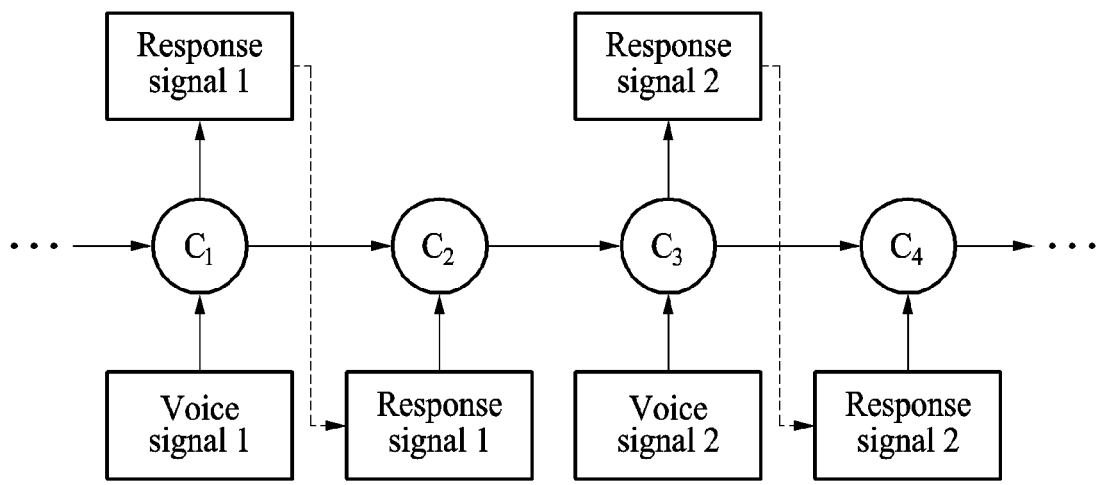
FIG. 2 illustrates an example of a process of generating a response signal corresponding to a voice signal based on a context.

FIG. 2 illustrates an example of a process of generating a response signal corresponding to a voice signal based on a context.

FIG. 2 illustrates an example of generating a response signal to a voice signal based on a context that reflects a voice signal of a user and a response signal of the electronic device.

For example, a voice signal 1 received from a user is reflected in a context $C_1$. Although not shown in FIG. 2, in an example, the context $C_1$ is a context obtained by additionally reflecting a previous voice signal and a previous response signal. A response signal 1 corresponding to the voice signal 1 is generated based on previous conversations through the context C1. The response signal 1 is additionally reflected in the context $C_1$, to determine a context $C_2$.

A voice signal 2 received from the user is additionally reflected in the context $C_2$, to determine a context $C_3$. A response signal 2 corresponding to the voice signal 2 is generated based on the context $C_3$. The response signal 2 is additionally reflected in the context $C_3$, to generate a context $C_4$.

As described above, a response signal is generated based on a context that continues to be updated based on a voice signal received from a user and a response signal generated in response to the voice signal, and thus it is possible to continue a conversation instead of needing to repeat previous conversations.

Figure 3:
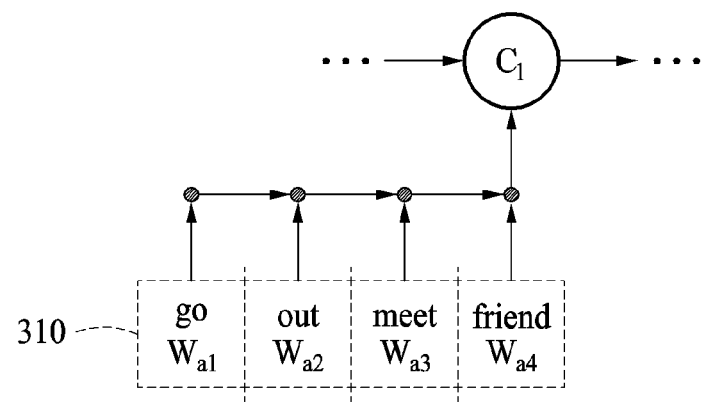
FIGS. 3 and 4 illustrate examples of a process of reflecting a voice signal and a response signal in a context.
Figure 4:
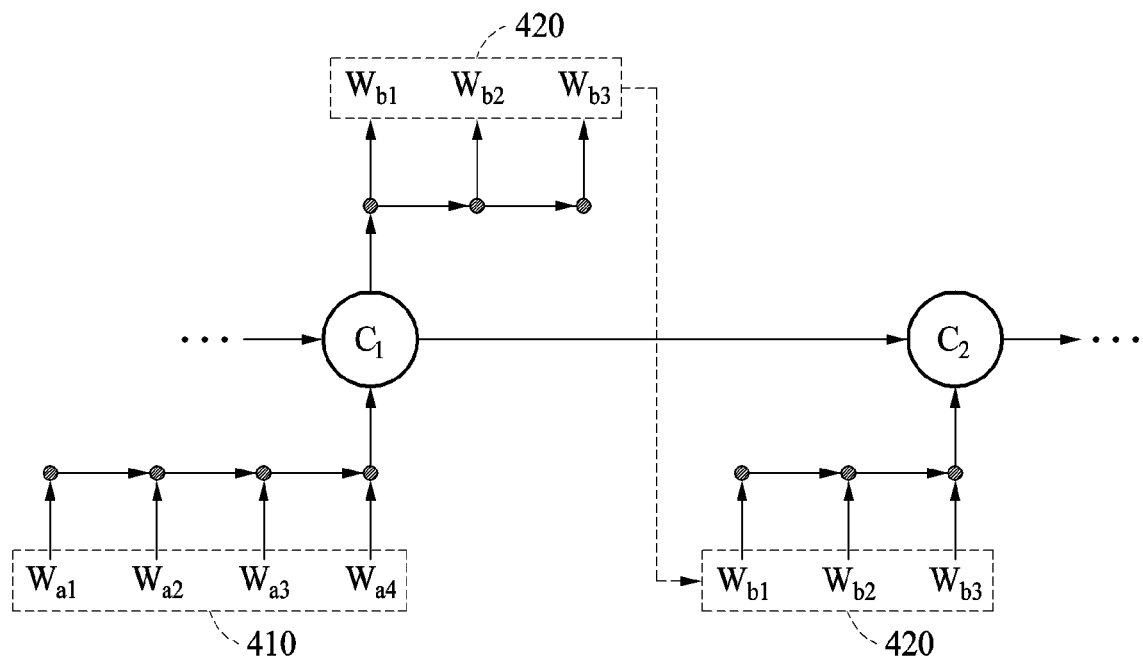

FIGS. 3 and 4 illustrate examples of a process of reflecting a voice signal and a response signal in a context.

FIG. 3 illustrates an example in which a voice signal 310 is reflected in a context $C_1$.

For convenience of description, the voice signal 310 "I'll go out to meet a friend" is assumed to be received from a user. For example, words $w_{a1}$, $w_{a2}$, $w_{a3}$ and $w_{a4}$ included in the voice signal 310 are sequentially input to an encoder of a neural network. In an example, the neural network is a recurrent neural network, and a result of encoding words input at a previous point in time has an influence on a result of encoding words input at a current point in time. Results of encoding sequentially input words are reflected in previous contexts, to determine a context $C_1$.

FIG. 4 illustrates an example in which a response signal 420 is reflected to determine a context $C_2$.

As described above in the example of FIG. 3, a context $C_1$ is determined by reflecting an encoding result of a voice signal 410 received from a user. The response signal 420 corresponding to the voice signal 410 is generated based on the context $C_1$ in a decoder of a neural network. The decoder sequentially generates words $w_{b1}$, $w_{b2}$ and $w_{b3}$ of the response signal 420. The generated words $w_{b1}$, $w_{b2}$ and $w_{b3}$ are input again to the decoder and are used to generate a next word in the response signal 420.

The generated response signal 420 is provided to a user. The words $w_{b1}$, $w_{b2}$ and $w_{b3}$ of the response signal 420 are sequentially input to an encoder of the neural network as described above in the example of FIG. 3. The encoding result of the words $w_{b1}$, $w_{b2}$ and $w_{b3}$ of the response signal 420 is reflected in the context $C_1$ so that the context $C_2$ can be determined. Thus, using contexts updated based on the generated response signal 420 as well as the voice signal 410, it is possible to perform a more natural and consecutive conversation between a user and an electronic device.

Figure 5:
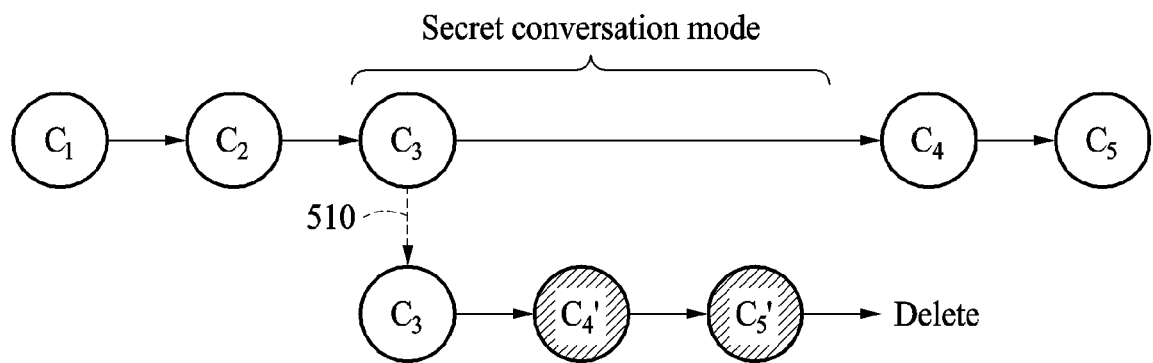
FIGS. 5 and 6 illustrate examples of a process of maintaining a context.
Figure 6:
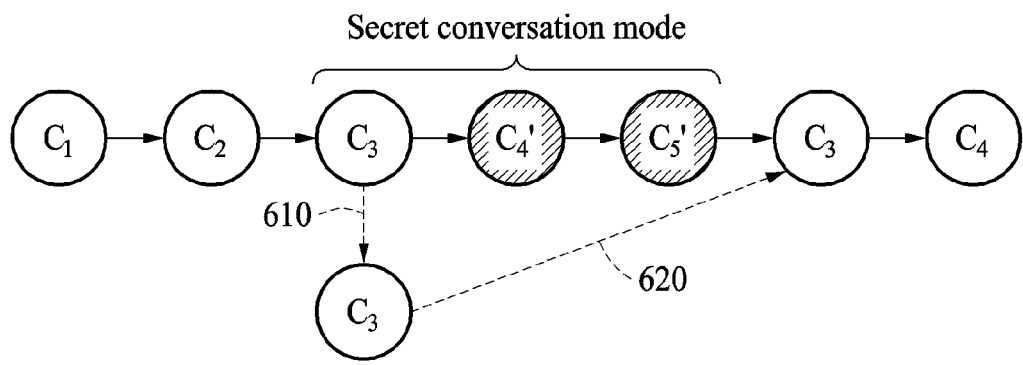

FIGS. 5 and 6 illustrate examples of a process of maintaining a context.

FIG. 5 illustrates an example of maintaining a context for a secret conversation. For convenience of description, a voice signal and a response signal to be reflected in contexts are not shown in FIG. 5. For example, a context $C_1$ is gradually updated to a context $C_3$ by additionally reflecting a voice signal or a response signal in contexts. In this example, when a request for a secret conversation is received from a user, the request is not reflected in the context $C_3$ and the context $C_3$ is maintained.

While the context $C_3$ is maintained, in operation 510, the context $C_3$ and a dialog system are copied to a separate memory space. Based on the copied context $C_3$ and the copied dialog system, a secret conversation with a corresponding user is performed. For example, a voice signal received from the user during the secret conversation is additionally reflected in the copied context $C_3$, to determine a context $C_4'$ and to generate a response signal based on a context $C_4'$. Also, the generated response signal is additionally reflected in the context $C_4'$, to determine a context $C_5'$.

When the secret conversation ends, the dialog system and the context $C_5'$ updated during the secret conversation are deleted. A voice signal received after the secret conversation ends is reflected in the maintained context $C_3$, to determine a context $C_4$ and to generate a response signal corresponding to the voice signal based on the context $C_4$. In turn, the response signal is reflected in the context $C_4$ to determine a context $C_5$.

FIG. 6 illustrates another example of maintaining a context for a secret conversation. For convenience of description, a voice signal and a response signal to be reflected in contexts are not shown in FIG. 6.

In an example, when a request for a secret conversation is received from a user, a context $C_3$ that does not reflect the request is maintained. In an example, the context $C_3$ is copied and maintained in a separate memory space in operation 610. Based on the original context $C_3$, a secret conversation with the user is performed. For example, a voice signal received from the user during the secret conversation is additionally reflected in the original context $C_3$, to determine a context $C_4'$ and to generate a response signal based on the context $C_4'$. In an example, the generated response signal is additionally reflected in the context $C_4'$, to determine a context $C_5'$.

When the secret conversation ends, the context $C_5'$ updated during the secret conversation is replaced with the maintained context $C_3$ in operation 620. A voice signal received after the secret conversation ends is reflected in the maintained context $C_3$, to determine a context $C_4$ and to generate a response signal corresponding to the voice signal based on the context $C_4$.

Figure 7:
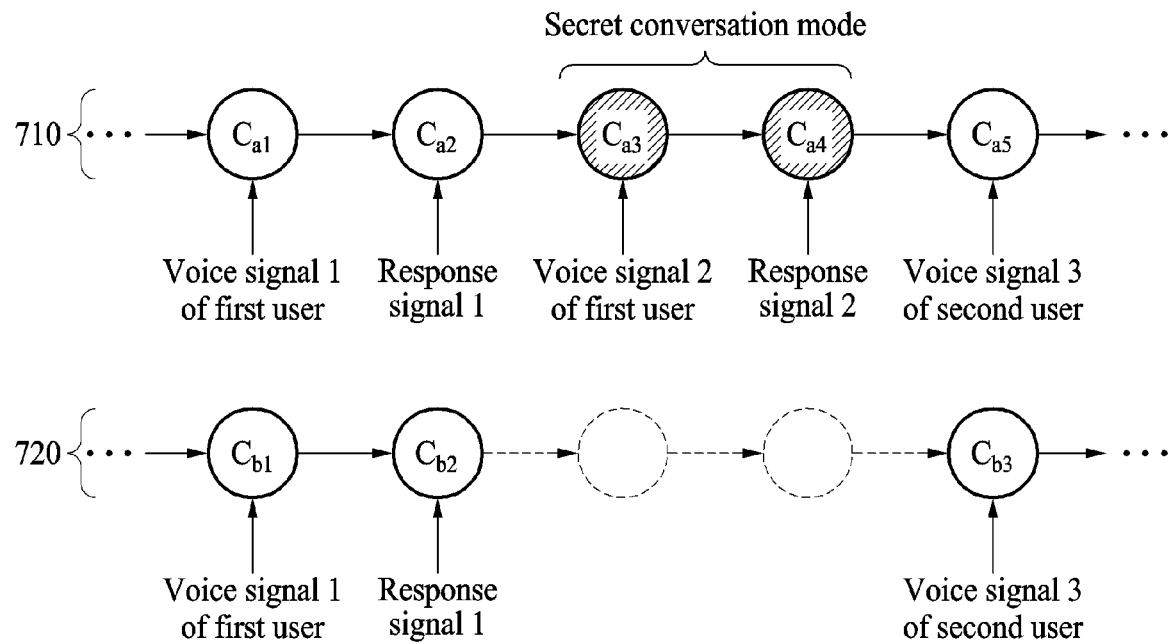
FIG. 7 illustrates an example of contexts for each user.

FIG. 7 illustrates an example of contexts for each user. FIG. 7 illustrates contexts 710 corresponding to a first user and contexts 720 corresponding to a second user.

In an example, contexts exist separately for each user. In an example, a voice signal received during a general conversation instead of a secret conversation and a response signal corresponding to the voice signal are reflected in both a context of a corresponding user and a context of another user. Thus, a conversation between the user and an electronic device is performed based on previous conversations with the corresponding user and other users.

In FIG. 7, a voice signal 1 received from the first user during a general conversation is reflected in both a context of the first user and a context of the second user, and contexts $C_{a1}$ and $C_{b1}$ are determined. A response signal 1 corresponding to the voice signal 1 of the first user is generated based on the context $C_{a1}$, the generated response signal 1 is reflected in the contexts $C_{a1}$ and $C_{b1}$, and contexts $C_{a2}$ and $C_{b2}$ are determined.

When a request for a secret conversation is received from the first user, a voice signal 2 received from the first user is reflected in a context of the first user and is not reflected in a context of the second user. For example, the voice signal 2 of the first user is reflected in the context $C_{a2}$, and a context $C_{a3}$ is determined. In this example, the voice signal 2 is not reflected in the context $C_{b2}$, and accordingly the context $C_{b2}$ is maintained.

Also, a response signal 2 generated based on the context $C_{a3}$ is reflected in the context of the first user and is not reflected in the context of the second user. For example, the response signal 2 is reflected in the context $C_{a3}$, and a context $C_{a4}$ is determined. In this example, the response signal 2 is not reflected in the context $C_{b2}$, and accordingly the context $C_{b2}$ continues to be maintained.

When a secret conversation ends, a voice signal received from the second user and a response signal corresponding to the voice signal of the second user are reflected in both a context of the first user and a context of second user. For example, when the secret conversation ends, a voice signal 3 of the second user is reflected in the context $C_{b2}$, and a context $C_{b3}$ is determined. Also, the voice signal 3 is reflected in the context $C_{a4}$, and a context $C_{a5}$ is determined.

As described above, contents exist separately for each user, and a general conversation is reflected in both a context of a user and a context of another user. However, a secret conversation is reflected in a context of a corresponding user, and thus, the user continues to perform the secret conversion instead of needing to repeat a previous secret conversation.

Figures 8, 9:
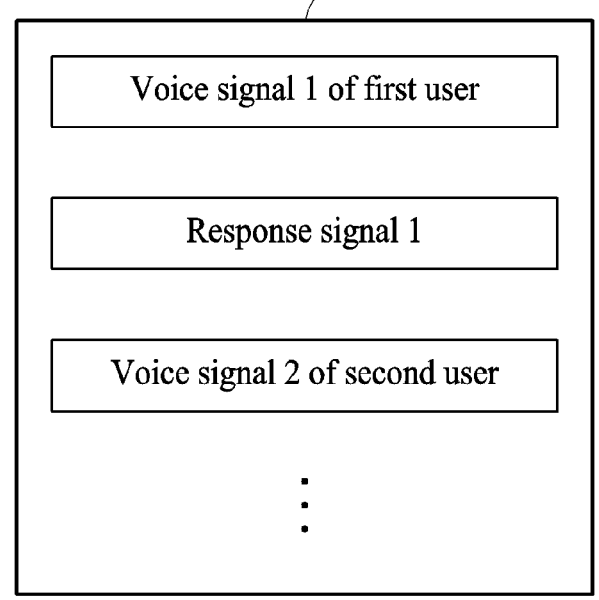
FIGS. 8 and 9 illustrate examples of contexts.

FIGS. 8 and 9 illustrate examples of contexts.

In the above description, a context is in a form of a vector used in a neural network, however, a form of a context is not limited thereto. In another example, a context is in a form of structured text or unstructured text.

FIG. 8 illustrates an example of a context 800 in a form of structured text. The context 800 includes at least one item and content corresponding to the item. The item includes, for example, a subject, a mood, a sentence type or a keyword, and the content corresponding to the item includes, for example, a detailed description of a corresponding item. For example, the context 800 reflects at least one voice signal received from a user and at least one response signal corresponding to the at least one voice signal. In this example, a response signal and a voice signal received during a secret conversation are not reflected in the context 800.

FIG. 9 illustrates an example of a context 900 in a form of unstructured text. The context 900 includes a voice signal received from a user and a response signal generated in response to the voice signal. For example, a voice signal received during a secret conversation and a response signal generated during the secret conversation are not included in the context 900, or are included in a context of a user participating in the secret conversation.

Figure 10:
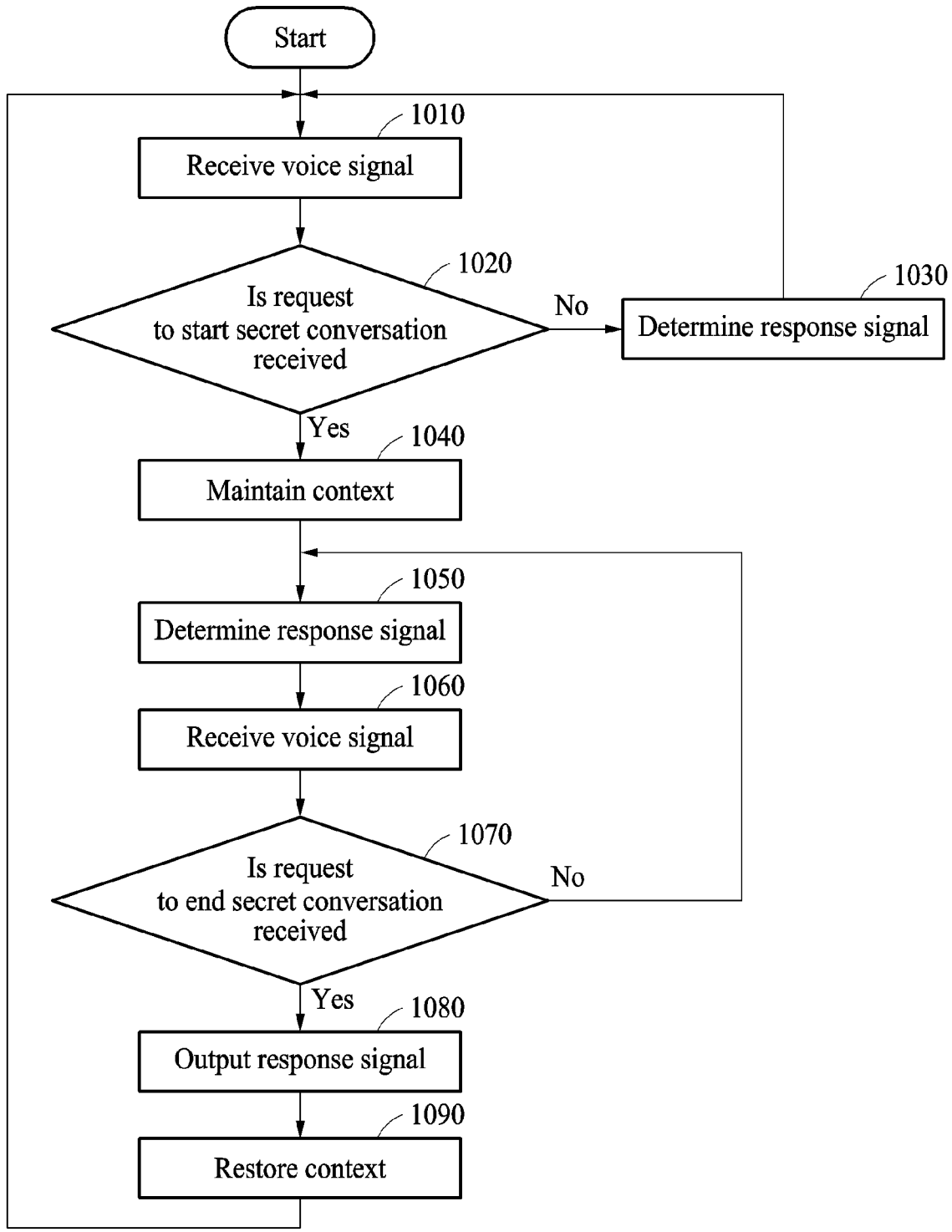
FIG. 10 illustrates an example of a method of an electronic device.

FIG. 10 is a diagram illustrating an example of operating an electronic device. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. In an example, the operating method of FIG. 10 is performed by a processor of the electronic device. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

In operation 1010, the electronic device receives a voice signal from a user.

In operation 1020, the electronic device determines whether a request to start a secret conversation is received. For example, the electronic device determines whether the start request is received based on at least one of whether the voice signal includes at least one word corresponding to the secret conversation and whether an input request a secret conversation is activated by the first user. In an example, the input to request the secret conversation could be in the form of pushing a button to request a secret conversation.

For example, when the voice signal received in operation 1010 includes at least one word corresponding to the secret conversation, or when a button to request a secret conversation is activated by a user, the electronic device determines to receive the request for the secret conversation. For example, the at least one word corresponding to the secret conversation includes various expressions that indicated a desire for a secret conversation, such as, for example, "Secret," "This is a secret," "You should not tell anyone," or "Surprise." Also, the button to request a secret conversation includes, for example, various buttons to request a secret conversation, such as a physical button included in the electronic device or a virtual button displayed on a touch screen of the electronic device.

When the request to start a secret conversation is not received, in operation 1030, the electronic device generates a response signal corresponding to the voice signal received in operation 1010 and outputs the response signal. For example, the response signal is output as audio through a speaker included in the electronic device, or is displayed as text on a display included in the electronic device. Also, the response signal is displayed as text on the display while being output as audio through the speaker.

When the request to start a secret conversation is received, in operation 1040, the electronic device maintains a context that does not reflect the voice signal received in operation 1010. The above description of FIGS. 5 and 6 is also applicable to a scheme of maintaining a context, and are incorporated herein by reference, accordingly is not repeated here.

In an example, to indicate that the electronic device is currently operating in a secret conversation mode, a lamp included in the electronic device is turned on, or a pattern, a phrase or a background color is displayed on a display of the electronic device. Thus, the user recognizes that a secret conversation is currently being performed, based on the above displays.

In operation 1050, the electronic device generates a response signal corresponding to the voice signal received in operation 1010 and outputs the response signal. For example, the response signal is output using at least one of a display and a speaker included in the electronic device.

In operation 1060, the electronic device receives another voice signal from the user.

In operation 1070, the electronic device determines whether a request to end the secret conversation is received from the user. For example, the electronic device determines whether the request to end the secret conversation is received based on at least one of whether the voice signal received in operation 1060 includes at least one word corresponding to an end of the secret conversation, or whether a button to request the end of the secret conversation is activated by the user.

The at least one word corresponding to the end of the secret conversation includes, for example, various expressions indicating the end of the secret conversation such as "End of secret," "Secret termination," "Secret conversation end" or "Keep it secret." Also, the button to request the end of the secret conversation includes, for example, various buttons to request an end of a secret conversation, such as a physical button included in the electronic device or a virtual button displayed on a touch screen of the electronic device.

When the request to end the secret conversation is not received, the operating method reverts to operation 1050 and the electronic device generates a response signal corresponding to the voice signal received in operation 1060 and outputs the response signal.

When the request to end the secret conversation is received, the electronic device generates a response signal corresponding to the voice signal received in operation 1060 and outputs the response signal in operation 1080. In an example, the electronic device turns off a lamp used to indicate that the electronic device is operating in a secret conversation mode, or does not display a predetermined pattern, a phrase or a background color. Thus, the user may recognize that the secret conversation ends and that the electronic device is operating in a general conversation mode.

In operation 1090, the electronic device restores the context maintained in the operation 1040. Thus, it is possible to perform a general conversation based on a context that does not reflect a voice signal received during a secret conversation or a response signal generated during the secret conversation.

Figure 11:
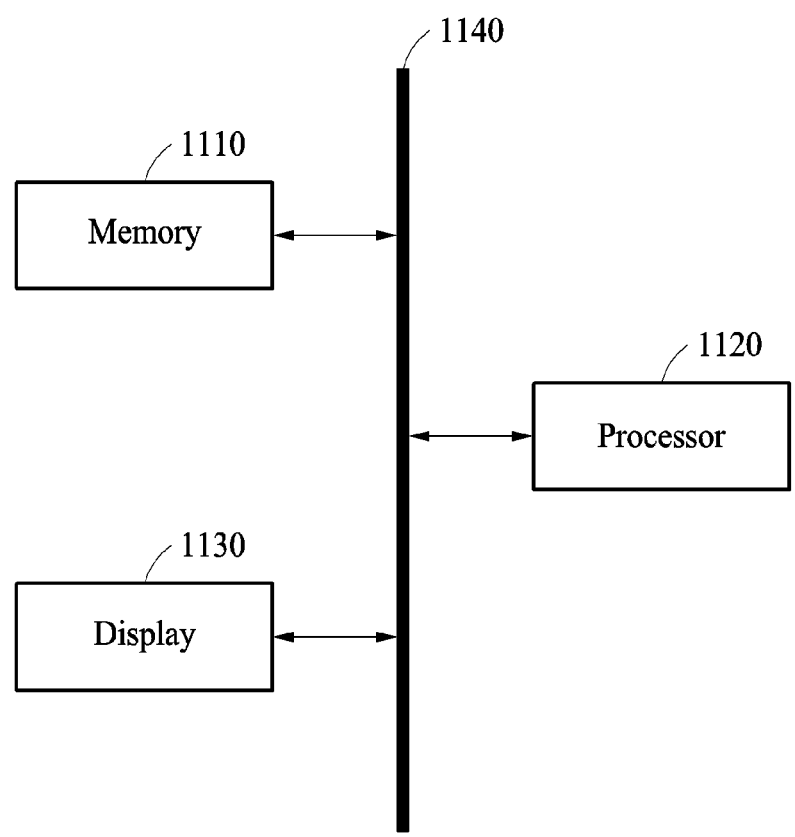
FIG. 11 illustrates an example of an electronic device.

FIG. 11 illustrates an example of an electronic device 1100.

Referring to FIG. 11, the electronic device 1100 includes a memory 1110, a processor 1120, and a display 1130. The memory 1110, the processor 1120, and the display 1130 communicate with each other via a bus 1140.

The memory 1110 stores computer-readable instructions. The processor 1120 performs the above-described operations in response to the instruction in the memory 1110 being executed by the processor 1120. The memory 1110 is, for example, a volatile memory or a non-volatile memory. Further details on the memory 1110 are provided below.

The processor 1120 is, for example, an apparatus configured to execute instructions or programs or to control the electronic device 1100. For example, when a request for a secret conversation is received from a first user, the processor 1120 maintains a context that does not reflect the request. When a secret conversation with the first user ends, the processor 1120 generates a response signal corresponding to a voice signal received from another user, for example, a second user, based on the maintained context. Further details on the processor 1120 are provided below.

In an example, the display 1130 is a physical structure that includes one or more hardware components that provide the ability to render a user interface and/or receive user input. The display 1130 can encompass any combination of display region, gesture capture region, a touch sensitive display, and/or a configurable area. In an example, the display 1130 can be embedded in the electronic device 1100. In an example, the display 1130 is an external peripheral device that may be attached to and detached from the electronic device 1100. The display 1130 may be a single-screen or a multi-screen display. A single physical screen can include multiple displays that are managed as separate logical displays permitting different content to be displayed on separate displays although part of the same physical screen.

In an example, the electronic device 1100 displays the response signal as text on a windshield glass of a vehicle through a head-up display (HUD). In another example, the electronic device 1100 displays the response signal in any other instrument cluster, vehicular infotainment system, screen in the vehicle, or display panel in the vehicle may perform the display function. Other displays, such as, for example, an eye glass display (EGD), which includes one-eyed glass or two-eyed glasses, that are operatively connected to the electronic device 1100 may be used to display the response signal as text, without departing from the spirit and scope of the illustrative examples described.

In an example, the response signal is output as audio through a speaker included in the electronic device.

The electronic devices and other apparatuses, units, modules, devices, and other components that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIGS. 1-7 and 10 that performs the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes at least one of an applet, a dynamic link library (DLL), middleware, firmware, a device driver, an application program storing the method of preventing the collision. In one another example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating a dialog apparatus, the method comprising:
   receiving a start request for a secret conversation from a user;
   storing a context at a time when the start request is received;
   receiving an end request for the secret conversation from the user;
   connecting a context at a time when the end request is received to the stored context when the start request is received, without reflecting a voice signal received from the user during the secret conversation; and
   generating, by a conversational agent of the dialog apparatus, a voice signal based on the connected context, without reflecting the voice signal received from the user during the secret conversation.

2. The method of claim 1, further comprising:
   generating a response signal to a voice signal of another user based on the connected context.

3. The method of claim 2, wherein the generating of the response signal comprises reflecting the voice signal of the another user in the connected context, and generating the response signal corresponding to the voice signal of the another user based on the connected context reflecting the voice signal.

4. The method of claim 1, wherein the storing of the context does not comprise storing the voice signal received from the user during the secret conversation and a response signal generated during the secret conversation.

5. The method of claim 1, wherein the storing of the context comprises maintaining a context that reflects conversation information acquired before the start request for the secret conversation is received and that does not reflect the start request for the secret conversation.

6. The method of claim 5, wherein the conversation information comprises a voice signal that is received before the start request for the secret conversation is received, and a response signal that is generated before the start request for the secret conversation is received.

7. The method of claim 1, wherein the secret conversation with the user is performed based on reflecting a voice signal received from the user during the secret conversation in the stored context, and generating a response signal corresponding to the voice signal based on the stored context reflecting the voice signal.

8. The method of claim 1, wherein the receiving of the start request comprises
   determining whether the start request for the secret conversation is received from the user based on any one or any combination of whether the voice signal of the user comprises a word corresponding to the secret conversation, and whether a button is activated by the user to request the secret conversation.

9. The method of claim 1, wherein the context comprises one of structured text, unstructured text, and a vector that indicate a context of a conversation between the dialog apparatus and the user.

10. The method of claim 1, wherein
    the context comprises a first context for the user and a second context for another user,
    the storing of the context comprises maintaining the second context, and a voice signal received from the user during the secret conversation and a response signal generated during the secret conversation are reflected in the first context.

11. The method of claim 10, wherein the generating of the response signal comprises generating a response signal corresponding to a voice signal of the another user based on the second context.

12. The method of claim 10, wherein a voice signal received from the user or the another user after the end request and a response signal corresponding to the voice signal are reflected in the first context and the second context.

13. A non-transitory computer-readable storage medium storing instructions that, when executed by a processor, cause the processor to perform the operating method of claim 1.

14. A dialog apparatus comprising:
a processor configured to
receive a start request for a secret conversation from a user,
store a context at a time when the start request is received,
receive an end request for the secret conversation from the user,
connect a context at a time when the end request is received to the stored context when the start request is received without reflecting a voice signal received from the user during the secret conversation; and
generate, by a conversational agent of the dialog apparatus, a voice signal based on the connected context, without reflecting the voice signal received from the user during the secret conversation.

15. The dialog apparatus of claim 14, wherein the processor is further configured to generate a response signal to a voice signal of another user based on the connected context.

16. The dialog apparatus of claim 14, wherein the processor is further configured to maintain a context that reflects conversation information acquired before the start request for the secret conversation is received and that does not reflect the start request for the secret conversation.

17. The dialog apparatus of claim 14, wherein the processor is further configured to perform the secret conversation with the user based on reflecting a voice signal received from the user during the secret conversation in the stored context and to generate a response signal corresponding to the voice signal based on the stored context reflecting the voice signal.

18. The dialog apparatus of claim 14, wherein
the context comprise a first context for the user and a second context for another user, and
the processor is further configured to maintain the second context, and to reflect, in the first context, a voice signal received from the user during the secret conversation and a response signal generated during the secret conversation.

19. The dialog apparatus of claim 14, further comprising a memory configured to store the context and instructions executed by the processor to configure the processor to receive the start request, to store the context, to receive the end request, and to connect the context receive the start request, to store the context, to receive the end request, and to connect the context.

20. An electronic device comprising:
a display;
a memory configured to store one or more contexts; and
a dialog apparatus configured to
receive a start request for a secret conversation from a user,
indicate, on the display, that the context is not updated during the secret conversation and to store a context at a time when the start request is received,
receive an end request for the secret conversation from the user,
connect a context at a time when the end request is received to the stored context when the start request is received without reflecting a voice signal received from the user during the secret conversation,
generate, by a conversational agent of the dialog apparatus, a voice signal based on the connected context, without reflecting the voice signal received from the user during the secret conversation.

* * * * *